(12) United States Patent
Hasegawa (10) Patent No.: US 11,310,645 B2
(45) Date of Patent: Apr. 19, 2022

(54) COMMUNICATION TERMINAL THAT DETERMINES A CONNECTION REQUEST BASED ADVERTISING PACKET OF A CERTAIN TYPE AND METHOD THEREOF

(71) Applicant: CANON KABUSHIKI KAISHA, Tokyo (JP)

(72) Inventor: Kazuhide Hasegawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 16/267,626

(22) Filed: Feb. 5, 2019

(65) Prior Publication Data
US 2019/0246257 A1     Aug. 8, 2019

(30) Foreign Application Priority Data

Feb. 8, 2018  (JP) .............................. JP2018-021251

(51) Int. Cl.
*H04W 4/80*      (2018.01)
*H04W 8/00*      (2009.01)
(Continued)

(52) U.S. Cl.
CPC .......... *H04W 4/80* (2018.02); *H04N 1/00315* (2013.01); *H04W 8/005* (2013.01); *H04W 48/10* (2013.01); *H04W 48/16* (2013.01); *H04W 48/20* (2013.01); *H04W 76/14* (2018.02); *H04N 2201/0094* (2013.01)

(58) Field of Classification Search
CPC ....... H04W 4/80; H04W 8/005; H04W 76/14; H04W 48/20; H04W 48/16; H04W 48/10; H04W 84/18; H04N 1/00315; H04N 2201/0094
See application file for complete search history.

(56) References Cited

U.S. PATENT DOCUMENTS 5,717,506 A    2/1998  Yamamoto et al.
10,148,633 B2  12/2018 Suga
(Continued)

FOREIGN PATENT DOCUMENTS

JP    2015-119214 A    6/2015
JP    2016170702 A     9/2016
(Continued)

OTHER PUBLICATIONS

Japanese Office Action dated Jan. 6, 2022 in counterpart Japanese Patent Application No. 2018-021251.

*Primary Examiner* — Justin T Van Roie (74) *Attorney, Agent, or Firm* — Venable LLP (57) ABSTRACT

The present invention provides a communication terminal that performs wireless communication with an image processing apparatus which broadcasts different types of advertising packets. The communication terminal receives the different types of advertising packets periodically broadcasted from the image processing apparatus; identifies a type of the advertising packet currently received from the image processing apparatus by analyzing a PDU (Protocol Data Unit) in the currently received advertising packet; and transmits a connection request to the image processing apparatus that has transmitted the currently received advertising packet, after the type of the currently received advertising packet is identified to be a specific type.

19 Claims, 9 Drawing Sheets

(51) Int. Cl.
*H04W 76/14* (2018.01)
*H04W 48/20* (2009.01)
*H04W 48/16* (2009.01)
*H04N 1/00* (2006.01)
*H04W 48/10* (2009.01)

(56) References Cited

U.S. PATENT DOCUMENTS

| | | | |
|---|---|---|---|
| 2010/0093280 A1* | 4/2010 | Ahn | H04W 52/242 |
| | | | 455/41.2 |
| 2015/0172391 A1* | 6/2015 | Kasslin | H04W 52/0229 |
| | | | 370/338 |
| 2015/0327069 A1* | 11/2015 | Fu | H04W 76/10 |
| | | | 726/5 |
| 2016/0157048 A1* | 6/2016 | Ke | H04W 48/14 |
| | | | 455/41.2 |
| 2016/0269384 A1 | 9/2016 | Suga | |
| 2017/0013153 A1* | 1/2017 | Shin | H04N 1/00891 |
| 2017/0034856 A1* | 2/2017 | Takeuchi | H04L 12/189 |
| 2018/0317073 A1* | 11/2018 | Taylor | G06Q 30/0631 |
| 2019/0104557 A1* | 4/2019 | Fujita | H04W 88/023 |
| 2019/0141786 A1* | 5/2019 | Park | H04W 52/0216 |
| 2021/0058770 A1* | 2/2021 | Tian | H04L 63/0442 |

FOREIGN PATENT DOCUMENTS

| | | | | |
|---|---|---|---|---|
| JP | 2016220054 A | * | 12/2016 | |
| JP | 2017112511 A | * | 6/2017 | |
| JP | 2017-175445 A | | 9/2017 | |
| WO | WO-2016186106 A1 | * | 11/2016 | H04Q 9/00 |

\* cited by examiner

COMMUNICATION TERMINAL THAT DETERMINES A CONNECTION REQUEST BASED ADVERTISING PACKET OF A CERTAIN TYPE AND METHOD THEREOF

BACKGROUND OF THE INVENTION

Field of the Invention

The present invention relates to a communication terminal and a method thereof.

Description of the Related Art

There is a communication terminal such as a mobile terminal that has a near field communication function such as Bluetooth Low Energy (BLE) of Bluetooth® and can perform wireless communication with another apparatus. The communication terminal receives an advertising packet broadcast from the other apparatus to detect the other apparatus. In addition, the communication terminal establishes communication (GATT (Generic Attribute) communication) using a GATT profile of BLE with the other apparatus to perform two-way communication.

For example, Japanese Patent Laid-Open No. 2016-170702 proposes a communication terminal that specifies the distance to an image processing apparatus based on the signal strength of a received advertising packet, and when it determines that the image processing apparatus is in the vicinity, establishes GATT communication and logs in to the image processing apparatus.

As for an advertising packet of BLE, a plurality of formats are defined, such as iBeacon® of Apple and EddyStone® of Google. Accordingly, an image processing apparatus periodically switches and transmits the advertising packets of a plurality of types so that it can support a plurality of communication terminals and a plurality of applications running on a communication terminal. For each advertising packet, information indicating whether a connection request for GATT communication is acceptable or not is set by the company which defines the format, a user, or the vender of the communication terminal.

In a period (time slot) corresponding to an advertising packet indicating that the communication terminal does not accept a connection request, the image processing apparatus does not return a response to a connection request for GATT communication transmitted from the communication terminal. In this case, after waiting for a predetermined time (after a timeout), the communication terminal can determine that the packet loss of the connection request for GATT communication or the response to it has occurred. Therefore, depending on the timing of transmitting a connection request by the communication terminal, a response to the user operating the communication terminal may delay until the timeout. In addition, the communication terminal can retransmit the connection request to the image processing apparatus subsequently. However, depending on the relationship between the advertising packet switching period of the image processing apparatus and the retransmission interval of the communication terminal, the communication terminal may retransmit the connection request in a time slot in which the image processing apparatus does not accept a connection request, resulting in a further delay of a response to the user.

SUMMARY OF THE INVENTION

An aspect of the present invention is to eliminate the above-mentioned problem with conventional technology.

A feature of the present invention is to provide a technique of improving the responsiveness to the user of a communication terminal that transmits a connection request to an image processing apparatus.

One aspect of the present invention provides a communication terminal that performs wireless communication based on BLE (Bluetooth Low Energy) with an image processing apparatus that broadcasts different types of advertising packets based on the BLE, the communication terminal comprising: a memory for storing one or more programs; and at least one processor that executes the one or more programs to function as: a reception unit that receives the different types of advertising packets periodically broadcasted based on the BLE from the image processing apparatus; an identification unit that identifies a type of the advertising packet currently received based on the BLE from the image processing apparatus by analyzing a PDU (Protocol Data Unit) in the currently received advertising packet; and a transmission unit that transmits a connection request based on the BLE to the image processing apparatus that has transmitted the currently received advertising packet, after the identification unit identifies the type of the currently received advertising packet to be a specific type.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

This embodiment provides a system for assisting a communication terminal that performs wireless communication based on Bluetooth Low Energy (BLE) of Bluetooth® with an image processing apparatus. This system provides a mechanism for controlling the timing of transmitting a connection request for GATT communication by the communication terminal.

Figure 1:
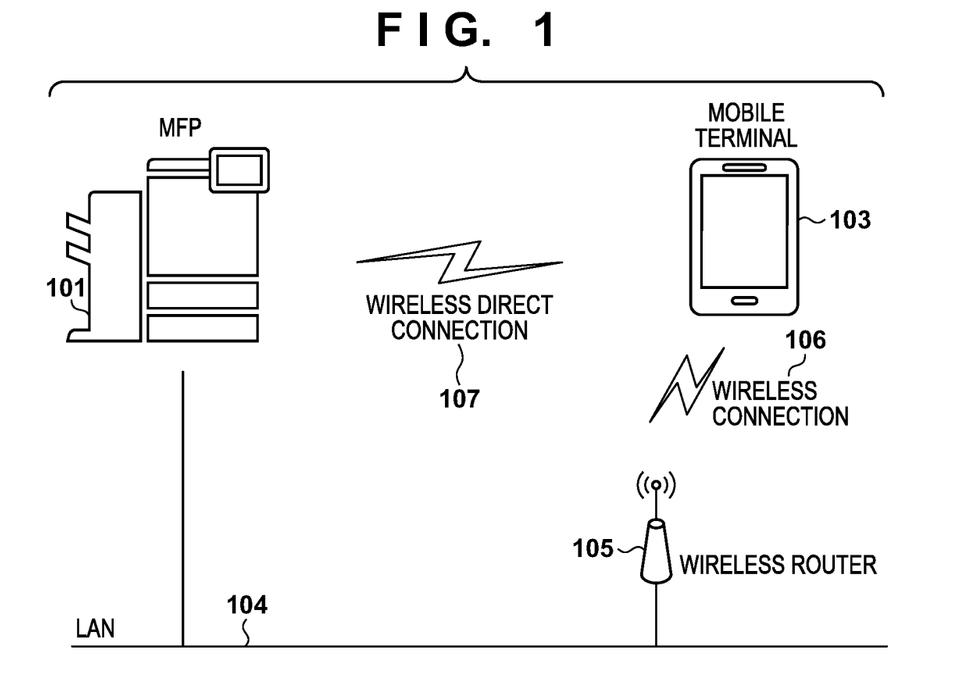
FIG. 1 a view showing an example of a system including a communication terminal according to an embodiment.

With reference to FIG. 1, a system including a communication terminal according to this embodiment will be described. The system shown in FIG. 1 includes an image processing apparatus (MFP) 101, a mobile terminal 103 as an example of the communication terminal according to this embodiment, a local area network (LAN) 104, and a wireless router 105.

The MFP 101 is an image processing apparatus capable of intercommunicating with the mobile terminal 103, another MFP, and the like via the LAN 104 or the wireless direct connection 107. The MFP 101 can be instructed to execute any of the functions such as printing and scanning by a user via the communication.

The mobile terminal 103 is a moving terminal operated by a user. It can intercommunicate with the MFP 101 on the LAN 104 via a wireless connection 106 or the wireless direct connection 107, and can cause any of the functions of the MFP 101 to be executed via the wireless communication.

Each of the MFP 101 and the mobile terminal 103 comprises a wireless communication function complying with BLE. In this embodiment, the MFP 101 periodically broadcasts an advertising packet, and the mobile terminal 103 receives it. In addition, the mobile terminal 103 transmits a connection request for establishing communication (GATT (Generic Attribute) communication) using a GATT profile of BLE to the MFP 101, so that it can perform two-way communication with the MFP 101. Furthermore, the MFP 101 can broadcast advertising packets of a plurality of formats. The communication between the MFP 101 and the mobile terminal 103 using BLE will be described later with reference to FIG. 4.

The wireless connection 106 is established by the mobile terminal 103 with the wireless router 105 connected to the LAN 104 in order to communicate with another apparatus such as the MFP 101 on the LAN 104. In an example, the wireless connection 106 is a Wi-Fi connection complying with a standard such as IEEE802.11a, 802.11b, 802.11g, 802.11n, or 802.11ac.

The wireless direct connection 107 is established between the MFP 101 and the mobile terminal 103 to perform direct wireless communication. In an example, the wireless direction connection 107 can be a Bluetooth connection including BLE, a wireless connection by Wi-Fi Direct®, or a connection by an ad hoc mode of Wi-Fi.

Note that the MFP 101 is shown to be connected to the LAN 104 by wired connection in FIG. 1, but, it may be arranged to connect to the LAN 104 via the wireless router 105 using wireless communication in an example. In another example, the MFP 101 may operate as an access point of a wireless LAN, and the MFP 101 may be capable of directly communicating with the mobile terminal 103 via the wireless direct connection 107.

The hardware arrangement of the image processing apparatus 101 and that of the communication terminal (mobile terminal 103) according to this embodiment will be described next with reference to FIG. 2.

The MFP 101 comprises a CPU 201, a ROM (Read Only Memory) 202, a RAM (Random Access Memory) 203, and an HDD (Hard Disk Drive) 204. The MFP 101 further comprises an operation unit 205, a printer 206, a scanner 207, an IC card reader 208, Bluetooth interface (I/F) 209, a network I/F 210, and a wireless network I/F 211. The respective components of the MFP 101 are connected to each other by an internal bus, and capable of exchanging data with each other.

The CPU 201 is a processor, a programmable logic circuit, or a microprocessor that controls the overall operation of the MFP 101. In addition, the CPU 201 performs various processes such as a print process, a scan process, and a communication process by reading out control programs stored in the ROM 202 and cooperating with the RAM 203 and the like.

The ROM 202 is a storage medium for the control programs, such as a flexible disk, a magnetic disk, an optical disk, a magnetooptical disk, a CD-ROM, a CD-R, a DVD-ROM, a magnetic tape, a non-volatile memory card, an EEPROM, or a silicon disk.

The RAM 203 is a volatile memory used as a work area and the like for executing various programs by the CPU 201. The HDD 204 is a mass storage medium for storing image data and the various programs. In an example, the ROM 202 is integrally formed with the HDD 204. The operation unit 205 comprises a touch panel display which enables a touch operation by a user. In addition, in an example, the operation unit 205 also includes an input unit such as a button, a keyboard, and a microphone, and an output unit such as an LED and a speaker.

The printer 206 prints image data transferred via the internal bus to paper. The scanner 207 reads an image on a document and generates image data. The IC card reader 208 reads an IC card used for user authentication.

The Bluetooth I/F 209 is capable of wireless communication complying with a Bluetooth® standard, and serves as an interface capable of intercommunicating with another equipment having a Bluetooth I/F. In this embodiment, the MFP 101 periodically broadcasts an advertising packet for informing another terminal of a service via the Bluetooth I/F 209. In this embodiment, the MFP 101 can transmit/receive data to/from the mobile terminal using near field communication based on BLE.

The network I/F 210 is a NIC (Network Interface Card) for connecting to the LAN 104 by wired connection. The wireless network I/F 211 is a NIC for connecting to a network of wireless direct communication.

The hardware arrangement of the mobile terminal 103 will be described next. In this embodiment, for example, as the communication terminal, the mobile terminal 103 is exemplified, which is a hand-held computer capable of being carried by a user, such as a smartphone or a tablet PC. Note that the communication terminal is not limited to this, and may be a communication terminal such as a notebook PC.

The mobile terminal 103 includes, as components, a CPU 212, a RAM 213, a flash memory 214, an operation unit 215, a Bluetooth I/F 216, a speaker 217, a microphone 218, a camera 219, a GPS 220, and a wireless network I/F 221. The respective components of the mobile terminal 103 are communicably connected to each other via an internal bus.

The CPU 212 is a processor, a programmable logic circuit, or a microprocessor that controls the overall operation of the mobile terminal 103. In the mobile terminal 103 of this embodiment, one CPU 212 performs the respective processes illustrated in the flowcharts to be described later by reading out the control programs stored in the flash memory 214 and cooperating with the respective components of the mobile terminal 103, including at least the RAM 213. The RAM 213 is a volatile memory used as a work area and the like for executing various programs by the CPU 212. The flash memory 214 is a non-volatile memory for storing the various programs and data. The mobile terminal 103 has been installed with a specific application (the application provided to a user by the vender of the MFP 101) for cooperating with the MFP. In addition, the mobile terminal 103 has been installed with an application corresponding to the advertising packet such as iBeacon or EddyStone. The application installed on the mobile terminal 103 is stored in the flash memory 214. Various applications can be installed on the mobile terminal 103, including the above-described applications. The operation unit 215 is a touch panel display which enables a touch operation by a user. In an example, the operation unit 215 includes an additive input unit such as a button or a keyboard. The operation unit 215 serves as an input unit for accepting a user operation and a display unit for informing the user of information.

The Bluetooth I/F 216 is an interface capable of communication complying with a Bluetooth standard, and intercommunicates with another equipment having a Bluetooth interface. In this embodiment, the mobile terminal 103 performs communication (the wireless direct connection 107) complying with the BLE standard with the MFP 101 via the Bluetooth I/F 216.

The wireless network I/F 221 is a NIC for wireless communication to use the wireless connection 106, thereby connecting to the wireless router 105 to connect to a network. In addition, when the mobile terminal 103 performs communication in Wi-Fi Direct or an ad hoc mode of Wi-Fi, it can directly connect to the MFP 101 via the wireless network I/F 221.

In an example, the speaker 217 can serve as an output unit to inform a user of a message through sound. In an example, the microphone 218 can also serve as an input unit to control the operation of the mobile terminal 103 by a user through sound. The camera 219 can capture a still image and a moving image and convert them into electronic data. The GPS 220 is a GPS (Global Positioning System) receiver. In an example, at least one of the speaker 217, the microphone 218, and the GPS 220 may be omitted.

Figure 2:
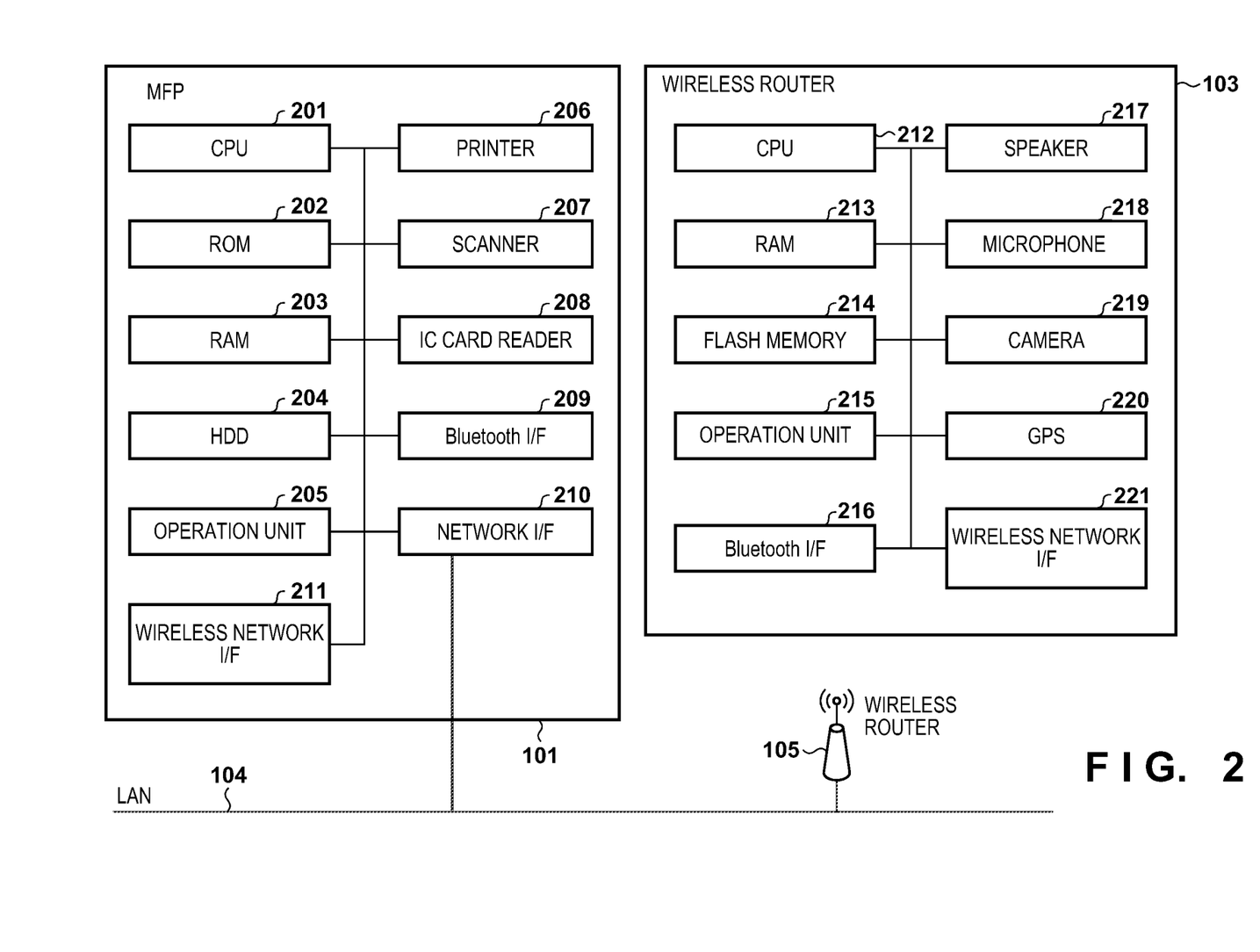
FIG. 2 is a view showing an example of the hardware arrangement of the system including the communication terminal according to the embodiment.

Note that the components shown in FIG. 2 are illustrated and described to facilitate understanding, it is to be understood that the function of one component may be implemented by multiple hardware, and one piece of hardware may implement the functions of the multiple components. For example, the respective processes to be illustrated in the flowcharts and described later can be performed by multiple processors, RAM, ROM, and storage cooperating together. In addition, some of the processes can be performed by cooperating with a GPU (Graphics Processing Unit) which is not shown.

The data structure of an advertising packet of BLE transmitted at predetermined intervals by the MFP 101 via the Bluetooth I/F 209 will be described next with reference to FIGS. 3A and 3B. Each company defines its specific format of an advertising packet of BLE, and two formats of an advertising packet are shown in FIGS. 3A and 3B.

Figure 3A:
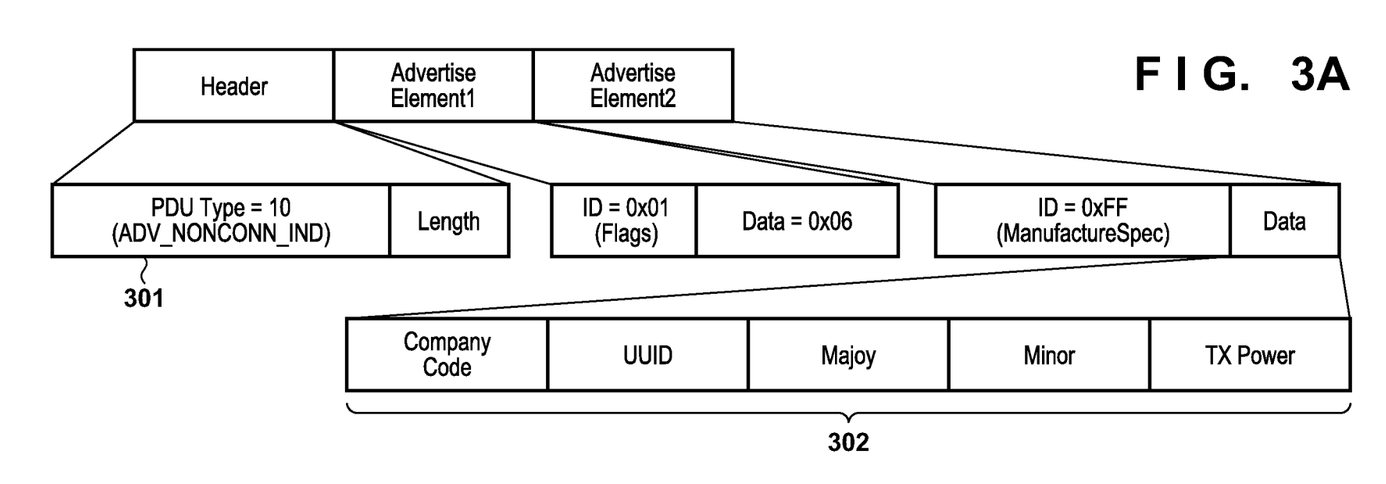
FIGS. 3A and 3B are views showing examples of the data structure of an advertising packet transmitted by an image processing apparatus that communicates with the communication terminal according to the embodiment.

FIG. 3A shows the format of an advertising packet (iBeacon) defined by Apple. An advertising packet of the iBeacon format is used by the mobile terminal 103 supporting iBeacon.

An advertising packet of the iBeacon format includes a PDU (Protocol Data Unit) type 301 and manufacturer-specific data 302 including a company code, UUID, a major number, a minor number, and a transmit signal strength value. In this embodiment, the transmit signal strength value of the Bluetooth I/F 209 of the MFP 101 is stored in the transmit signal strength value. In the advertising packet of the iBeacon format according to this embodiment, the PDU type 301 is set to ADV_NONCONN_IND (not interconnectable).

Figure 3B:
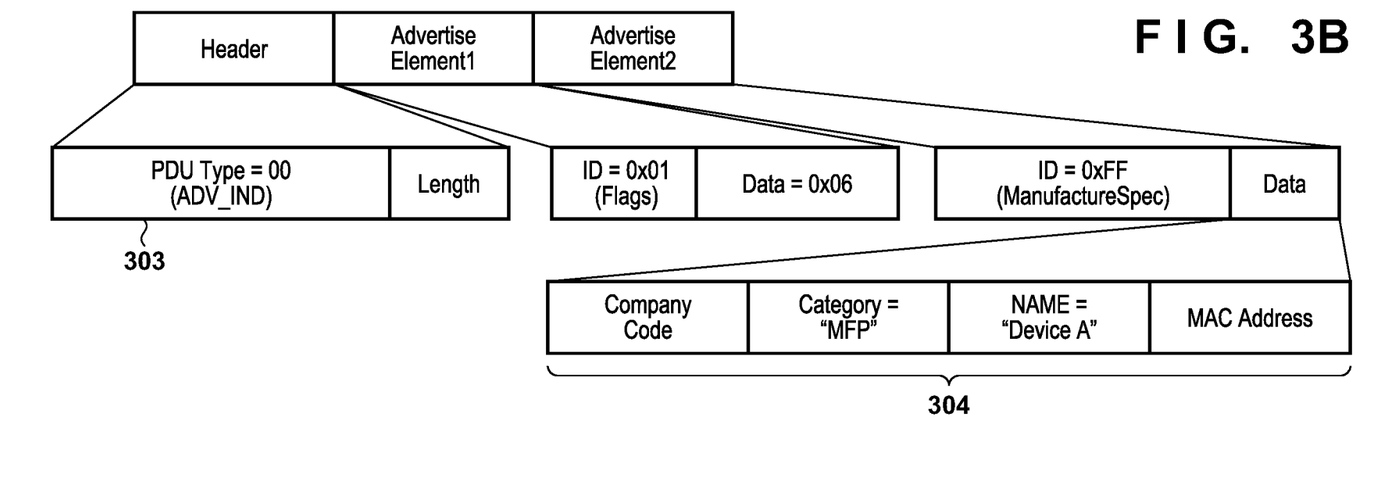

FIG. 3B shows the format of an advertising packet defined by the vender of the MFP 101 (to be referred to as an MFPBeacon for description hereinafter). An advertising packet of the MFPBeacon format is used by the mobile terminal 103 that has been installed with a specific application (the application provided to a user by the vender of the MFP 101), thereby supporting MFPBeacon.

An advertising packet of the MFPBeacon format includes a PDU type 303 and manufacturer-specific data 304 including a company code, a device category, a device name, and a MAC address. In this embodiment, the device name of the MFP 101 is stored in the device name, and the MAC address of the MFP 101 is stored in the MAC address. Note that in order that the mobile terminal 103 implements a service such as printing and scanning provided by the MFP 101 via the software program (application) installed on the mobile terminal 103, the MFP 101 and the mobile terminal 103 need to perform two-way communication. Therefore, in the advertising packet of the MFPBeacon format, the PDU type 303 is set to ADV_IND (interconnectable).

As described above, for each format of an advertising packet, "interconnectable" or "not interconnectable" for GATT communication is set in the PDU type 303.

The MFP 101 may transmit a plurality of types of advertising packets described above in order to be available for the various applications (the application corresponding to iBeacon for Print and the vender-specific cooperative application) installed on a plurality of mobile terminals 103. In this case, the MFP 101 transmits a plurality of types of advertising packets at predetermined time intervals while changing the type of the advertising packet. In a period (time slot) in which an advertising packet having the PDU type 303 set to ADV_IND (interconnectable) is transmitted, the MFP 101 accepts a connection request for GATT communication. On the other hand, in a time slot in which an advertising packet having the PDU type 303 set to ADV_NONCONN_IND (not interconnectable) is transmitted, the MFP 101 does not accept a connection request for GATT communication.

Figure 4:
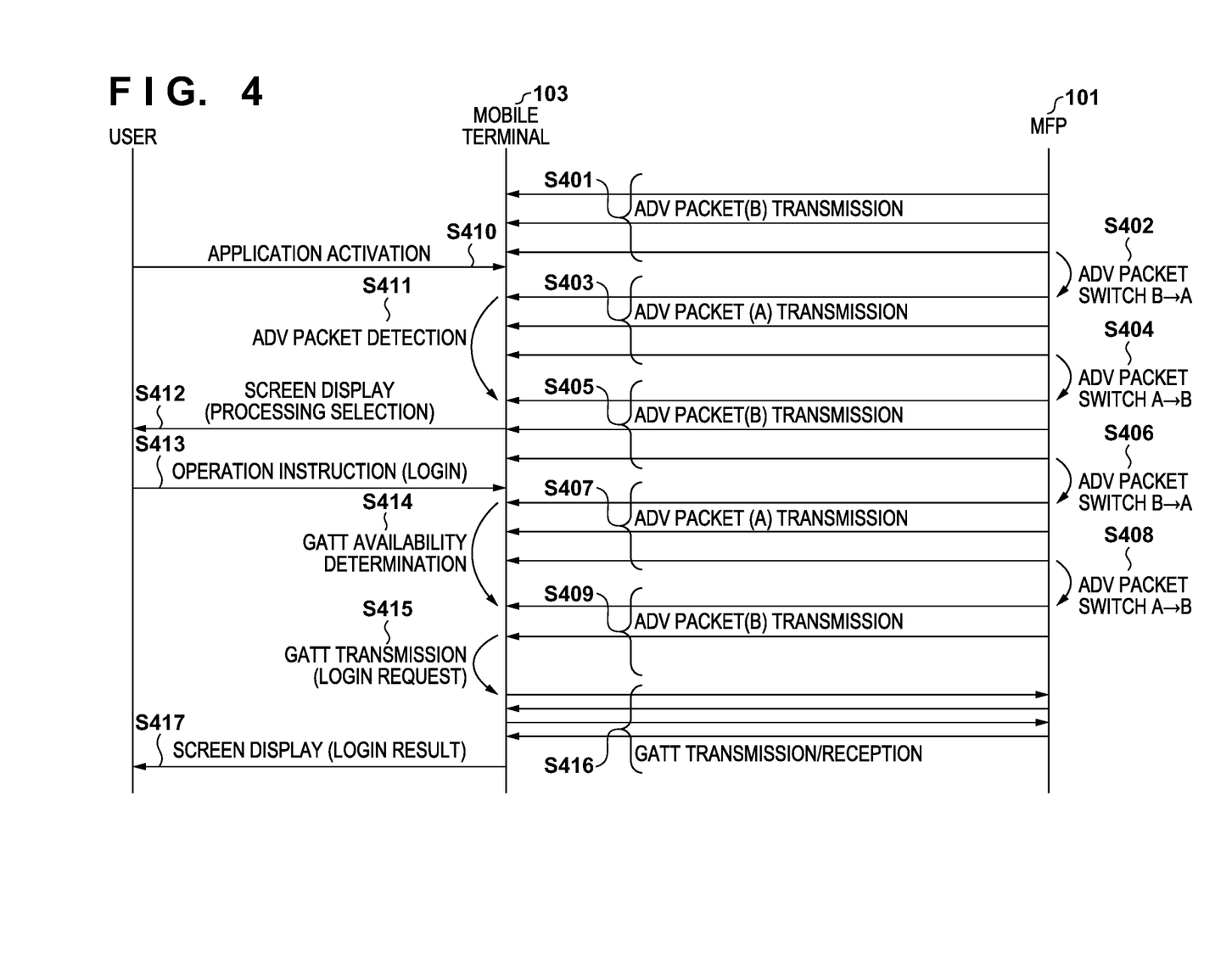
FIG. 4 is a sequence chart showing an example of the communication between the image processing apparatus and the communication terminal according to the embodiment.

An example of the processing, in which the MFP 101 transmits a plurality of types of advertising packets using BLE communication and the mobile terminal 103 transmits a connection request to the MFP 101 in accordance with a user operation, will be described next with reference to FIG. 4.

In accordance with the setting, the MFP 101 periodically transmits advertising packets from the Bluetooth I/F 209 at predetermined time intervals (for example, intervals of 100 msec) (step S401, step S403, step S405, step S407, and step S409). In addition, in accordance with the setting, the MFP 101 switches the type of the advertising packet transmitted from the Bluetooth I/F 209 to another type at predetermined time intervals (for example, intervals of 1,000 msec) (step S402, step S404, step S406, and step S408). In an example, these settings are input by the user via the operation unit 205, or may be set by the vender of the MFP 101 and stored in the HDD 204. Advertising packets A and B shown in FIG.

4 can correspond to an advertising packet (A) of the iBeacon format and an advertising packet (B) of the MFPBeacon format, respectively. That is, the advertising packet (A) is the advertising packet that does not accept a connection request for GATT communication, and the advertising packet (B) is the advertising packet that accepts a connection request for GATT communication.

If instructed by the user to activate the application for performing Bluetooth communication with the MFP 101 via the operation unit 215 (step S410), the mobile terminal 103 starts to detect an advertising packet by the Bluetooth I/F 216. If an advertising packet is detected, the mobile terminal 103 determines whether it is the advertising packet transmitted from the image processing apparatus 101 available for the mobile terminal 103, based on the information (for example, the manufacturer-specific data 304) included in the advertising packet (step S411).

If the mobile terminal 103 determines that the image processing apparatus 101 which has transmitted the advertising packet is available, it displays an application screen or updates the application screen being displayed on the operation unit 215 based on the manufacturer-specific data 304 (step S412).

If an operation instruction is accepted from the user via the operation unit 215 (step S413), the mobile terminal 103 determines whether GATT communication is required for executing the operation instruction. In an example, if data transmission to the image processing apparatus 101 is required for executing the operation instruction from the user, it may be determined that GATT communication (two-way communication) is required for executing the operation instruction. If two-way communication is required, the mobile terminal 103 analyzes the PDU type 301 or 303 of the advertising packet received by the Bluetooth I/F 216, and determines whether it is the advertising packet indicating that a connection request for GATT communication is acceptable (step S414).

If the advertising packet received by the mobile terminal 103 indicates that a connection request for GATT communication is not acceptable, the mobile terminal 103 repeats the process of step S414 until it receives an advertising packet indicating that a connection request is acceptable. That is, if the PDU type of the received advertising packet is ADV_NONCONN_IND, the mobile terminal 103 repeats the process of step S414 until it receives an advertising packet having the PDU type set to ADV_IND. If the mobile terminal 103 determines that the received advertising packet indicates that a connection request for GATT communication is acceptable, that is, when it determines that the PDU type is set to ADV_IND, the mobile terminal 103 transmits a connection request for GATT communication (step S415). With this arrangement, it can be prevented that the mobile terminal 103 transmits a connection request for GATT communication in a time slot in which the MFP 101 does not accept a correction request so that unnecessary retransmission (retry process) occurs.

Then, the mobile terminal 103 receives a response for the connection request for GATT communication from the MFP 101, performs two-way communication with the MFP 101, and performs a process such as obtaining information from the MFP 101 and transmitting information to the MFP 101 (step S416). The mobile terminal 103 updates the application screen displayed on the operation unit 215 based on the information transmitted/received in the GATT communication (step S417).

Figure 5A:
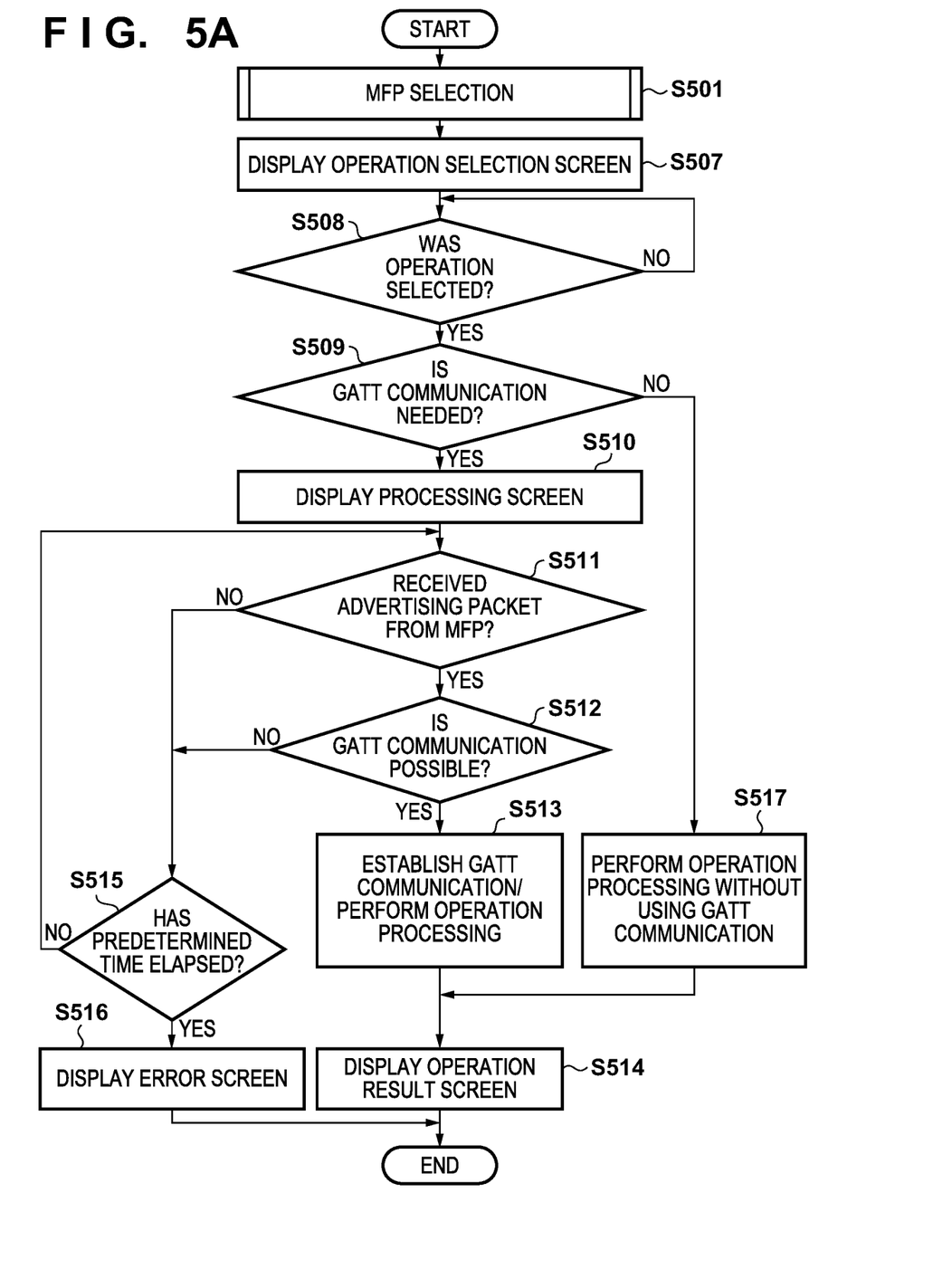
FIG. 5A is a flowchart illustrating an example of the processing performed by the communication terminal according to the embodiment.
Figure 5B:
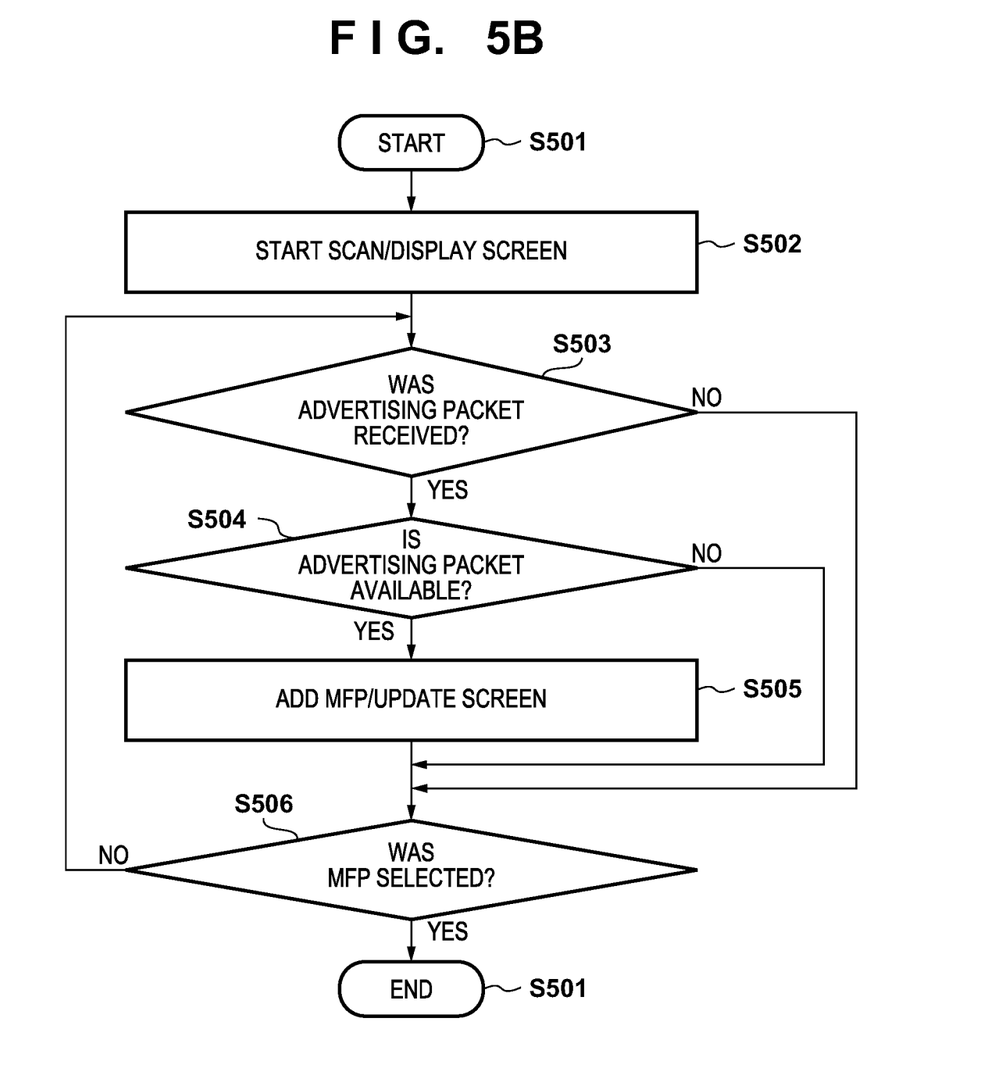
FIG. 5B is a flowchart illustrating an example of the processing performed by the communication terminal according to the embodiment.

An example of the processing in which the mobile terminal 103 detects an advertising packet, establishes GATT communication, and executes a user operation will be described with reference to flowcharts illustrated in FIGS. 5A and 5B and screen examples shown in FIGS. 6A to 6F. The respective operations (steps) illustrated in the flowcharts in FIGS. 5A and 5B are implemented by the CPU 212 which reads out the programs for implementing the respective control modules stored in the flash memory 214 into the RAM 213 and executes them. Note that the processes illustrated in the flowcharts are assumed to be implemented by the above-described specific application as the main body while cooperating with the OS as the control programs. Note that some of the processes are assumed to be implemented by cooperating with the respective interfaces and the respective hardware components such as the operation unit 215. FIGS. 6A to 6F show examples of the screen displayed by the specific application. In this embodiment, the CPU 212 of the mobile terminal 103 starts the processing shown in FIG. 5A when it is instructed to search for a printer from the user while the specific application is enabled on the mobile terminal 103. However, the CPU 212 of the mobile terminal 103 may start the processing shown in FIG. 5A in response to the activation of the specific application, as described with reference to FIG. 4.

First, the processing is started. In step S501, the mobile terminal 103 starts the process of selecting the MFP 101 targeted for the operation, and advances the process to step S502 shown in FIG. 5B.

Figures 6A, 6B:
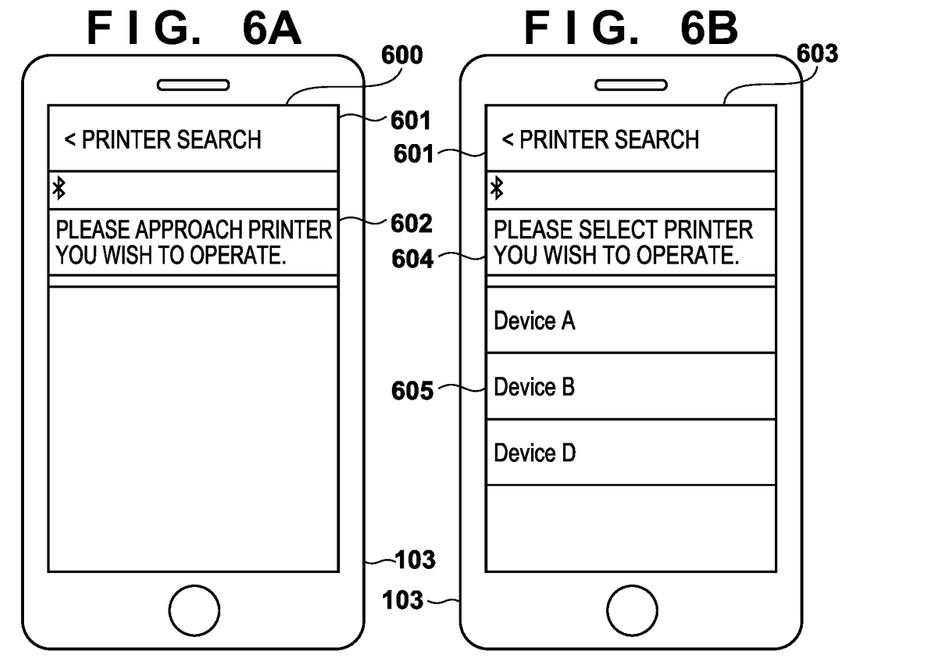
FIGS. 6A to 6F are views showing examples of the screen displayed on the operation unit of the communication terminal according to the embodiment.

In step S502, the mobile terminal 103 starts scanning by the Bluetooth I/F 216, and advances the process to step S503. In step S502, a search screen 600 including a screen title 601 informing that a printer search is in progress and a message 602 to the user is displayed on the operation unit 215 as shown in FIG. 6A. Since the mobile terminal 103 searches for the nearby MFP 101 based on the received advertising packet, a message to the user to approach the target MFP 101 is displayed in the message 602.

In step S503, the mobile terminal 103 determines whether an advertising packet from the MFP 101 is detected. If an advertising packet is received in step S503, the mobile terminal 103 advances the process to step S504. If no advertising packet is received in step S503, the mobile terminal 103 advances the process to step S506.

In step S504, the mobile terminal 103 determines whether the received advertising packet has been transmitted from the MFP 101 available for the mobile terminal 103, based on the company code and device category included in the advertising packet. In an example, the mobile terminal 103 may have stored the information of the company code, device name, or MAC address corresponding to the available MFP 101 in a database stored in the flash memory 214 or the like. In this case, the information of the company code, device category, or MAC address included in the received advertising packet may be collated with the database in step S504 to determine whether the received advertising packet has been transmitted from the available MFP 101. In addition, the mobile terminal 103 may be able to register the information of the company code, device name, or MAC address corresponding to the available MFP 101, or may be able to download the information from another apparatus such as a server, in accordance with a user operation.

Then in step S505, the mobile terminal 103 displays the device name and the like of the MFP 101 determined to be available on the screen as shown in FIG. 6B. In a device name list 605 shown in FIG. 6B, the three MFPs 101, that is, Device A, Device B, and Device C are displayed. The display order can be decided based on the device name, the order of detection, or the signal strength of the advertising packet. In addition, a message to the user to select the MFP 101 targeted for the operation from the device name list 605 is displayed in a message 604.

If no advertising packet is received in step S503, if the received advertising packet is not available in step S504, or if the screen is updated in step S505, the mobile terminal 103 determines whether a user operation of selecting the MFP 101 is accepted in step S506. If the user has not selected the MFP 101 in step S505, the mobile terminal 103 returns the process to step S503, and receives an advertising packet again. If a user operation of selecting one MFP is accepted in step S506, the mobile terminal advances the process to step S507. In an example, if the MFP 101 to be normally selected has been registered in the mobile terminal 103, the mobile terminal 103 may automatically select that MFP 101 without waiting for the user operation. Note that in step S506, the mobile terminal 103 may also return the process to step S503 if no selectable MFP 101 exist or if no selectable MFP 101 is displayed on the screen.

Figures 6C, 6D:
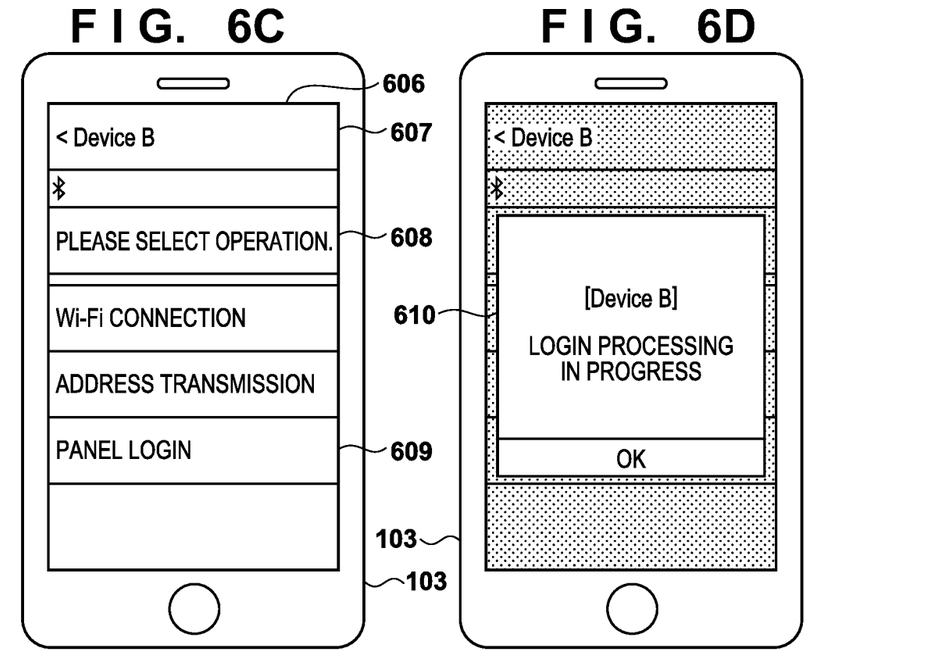

Next, in step S507, the mobile terminal 103 displays an operation selection screen 606 shown in FIG. 6C. A device name 607 of the MFP 101 selected in a search screen 603, a message 608 to the user, and operation item 609 are displayed on the operation selection screen 606. In the example shown in FIG. 6C, three operation items of "Wi-Fi connection", "destination transmission", and "panel login" are displayed as the operation item 609. "Wi-Fi connection" and "destination transmission" are operations that require two-way communication, in which a connection using the wireless network I/F 221 is tried first, and when it is failed, a connection using the Bluetooth I/F 216 is tried. "Panel login" is an operation that requires two-way communication, in which a connection using the Bluetooth I/F 216 is tried. If the screen is displayed in step S507, the mobile terminal 103 advances the process to step S508, and waits until the user selects any one of the operation items, that is, until a user operation is accepted (until the operation acceptance).

If any one of the items displayed as the operation item 609 of the MFP 101 is selected in step S508, the mobile terminal 103 advances the process to step S509. In step S509, the mobile terminal 103 determines whether GATT communication with the selected MFP 101 (the MFP targeted for the operation) is required for implementing the operation selected by the user in step S508.

For example, when the user selects "Wi-Fi connection" in step S508, the mobile terminal 103 can advance the process to step S509, and determine whether the IP address necessary for a wireless network connection can be obtained based on the MAC address included in the advertising packet received in step S503. In an example, the correspondence between the MAC address and IP address of the MFP targeted for the operation may have been registered in the database stored in the flash memory 214 or the like of the mobile terminal 103. Alternatively, the mobile terminal 103 may transmit the information about the MAC address of the MFP targeted for the operation via the wireless network I/F 221 to inquire the information about the IP address of the MFP targeted for the operation. If the IP address is obtained, the mobile terminal 103 uses that IP address to establish a wireless network connection with the MFP 101 targeted for the operation via the wireless network I/F 221 (step S517). If the IP address of the MFP targeted for the operation cannot be obtained, the mobile terminal 103 advances the process to step S510 to be described later.

For example, if the user selects "destination transmission" in step S508, the mobile terminal 103 can establish the wireless network connection 106 in step S509 if the IP address of the MFP targeted for the operation can be obtained, as in the above-described case in which "Wi-Fi connection" is selected. If the wireless network connection with the MFP targeted for the operation has already been established, or after establishing it, the mobile terminal 103 can transmit the destination information in the flash memory 214 to the MFP targeted for the operation via the wireless network I/F 221 (step S517). If the MFP 101 receives the destination information, it uses the destination information as the destination of the transmission function of externally transmitting an image obtained by scanning a document by the scanner 207 provided in the MFP 101. The destination information includes an electronic mail address and facsimile number (telephone number). If the wireless network connection 106 cannot be established, the mobile terminal 103 advances the process to step S510 to be described later, as in the above-described case in which "Wi-Fi connection" is selected.

For example, if the user selects "panel login" in step S508, the mobile terminal 103 advances the process to step S509, determines that GATT communication with the FMP 101 is required to be performed via the Bluetooth I/F 216, and advances the process to step S510. Note that "panel login" is a cooperation function of enabling a specific user to log in to the MFP by approaching the mobile terminal 103 to the MFP. In this embodiment, a case in which the user selects "panel login" in step S508 will be described below.

In step S510, the mobile terminal 103 displays a screen for informing the user that the process is in progress on the operation unit 215, as shown in FIG. 6D. Then, the mobile terminal 103 advances the process to step S511.

In step S511, the mobile terminal 103 starts to detect an advertising packet transmitted from the MFP targeted for the operation. If no advertising packet is detected within a certain time, the process advances to step S515. In step S515, if a predetermined time (for example, 1,000 msec) has not elapsed since the mobile terminal started the process of step S511 or the user selected the operation in step S508, the mobile terminal returns the process to step S511. If an advertising packet is received from the MFP targeted for the operation in step S511, the mobile terminal 103 advances the process to step S512, and determines whether the PDU type 301 of the received advertising packet indicates that GATT communication is acceptable, that is, whether it is set to ADV_IND.

Figure 6E:
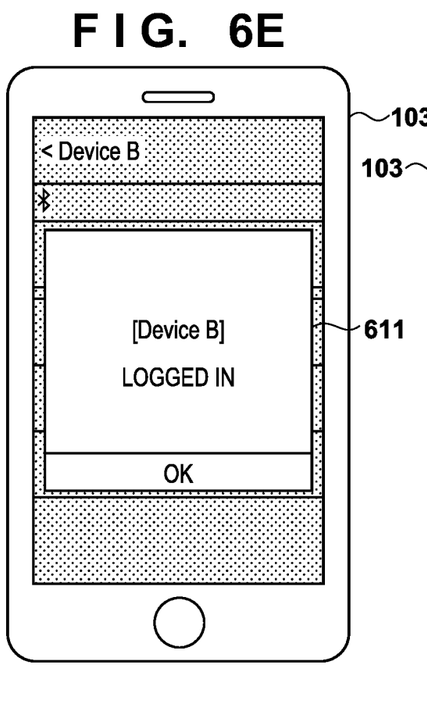

If the PDU type of the received advertising packet indicates that GATT communication is not acceptable in step S512, the mobile terminal 103 suspends the transmission of a connection request for GATT communication, advances the process to step S515, and returns the process to step S511 if the predetermined time has not elapsed. If the received advertising packet indicates that GATT communication is acceptable in step S512, the mobile terminal 103 advances the process to step S513 and transmits a connection request for GATT communication, thereby establishing GATT communication. In this embodiment, the mobile terminal 103 transmits the information necessary for user authentication to the MFP targeted for the operation in step S513 to request the MFP to perform a user authentication process. Note that the information necessary for user authentication transmitted in step S513 is the information based on the user information that is pre-registered in the application by the user as the setting for the specific application. Then, the mobile terminal 103 advances the process to step S514, and informs the user that the process is completed, as shown in FIG. 6E. If the information necessary for user authentication is received using the GATT communication, the MFP authenticates the user based on that information. If the authentication is successful, an operation screen based on the authority and favorite setting of the user who has been successfully authenticated is displayed on the operation unit of the MFP. Note that if the operation process is completed without using GATT communication in step S517, the mobile terminal 103 also advances the process to step S514 and informs the user that the selected process is completed.

Figure 6F:
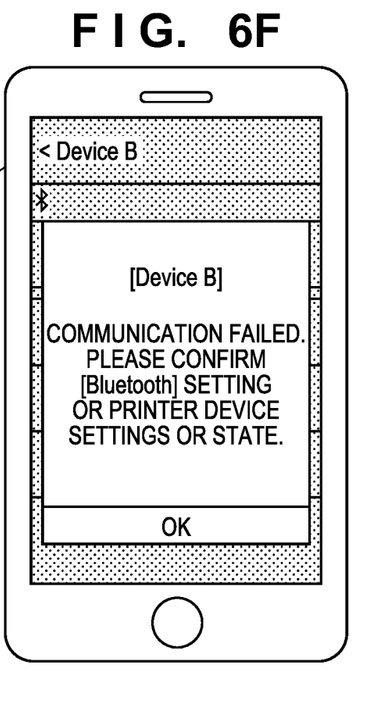

If it is determined in step S515 that the predetermined time has elapsed since the process of step S509 or step S510 is started, the mobile terminal 103 advances the process to step S516 and can inform the user that the operation selected by the user has failed, as shown in FIG. 6F.

As described above, in this embodiment, the mobile terminal determines whether the received advertising packet indicates that GATT communication is acceptable, and transmits a connection request for GATT communication in a predetermined time in which a connection request for GATT communication is acceptable. With this arrangement, it can be prevented that the mobile terminal transmits a connection request for GATT communication in the predetermined time in which it is not acceptable so that an unnecessary retry process occurs. This can improve the responsiveness to the user.

Second Embodiment

In the first embodiment, after the selection of an operation by the user or after starting to receive an advertising packet, the mobile terminal waits for receiving an advertising packet indicating that GATT communication is acceptable, and transmits a connection request. In the second embodiment, an example of the process of the mobile terminal in which a time to suspend the transmission of a connection request can be set based on one or more criteria will be described. Note that the description of the same structure or processing as in the first embodiment will be omitted.

In an example, the criterion may be the information about the operation mode of the MFP targeted for the operation.

The information about the operation mode of the MFP targeted for the operation is, for example, the information about the advertising packet transmission interval of the MFP targeted for the operation and the type switching interval of the advertising packet to be transmitted. For example, one MFP 101 transmits advertising packets at shorter transmission intervals or switching intervals in order to improve the responsiveness. In this case, the responsiveness to a connection request can be improved owing to the suspension time shorter than that of the other MFP 101. On the other hand, one MFP 101 transmits advertising packets at longer transmission intervals or switching intervals. In such a case, owing to the suspension time longer than that of the other MFP 101, it can be avoided that a connection request is determined to have failed before transmitting it to the MFP targeted for the operation.

In addition, the information about the operation mode of the MFP targeted for the operation is, for example, the type of the advertising packet transmitted by the MFP targeted for the operation. In an example, the MFP 101 may transmit two types of advertising packets indicating that a connection request is not acceptable, and one type of an advertising packet indicating that a connection request is acceptable. In this case, as compared to the MFP 101 that transmits one type of an advertising packet indicating that a connection request is not acceptable and one type of an advertising packet indicating that a connection request is acceptable, it is desirable to extend the suspension time. This is because assuming that the advertising packet transmission interval and the advertising packet switching interval are the same, using more types of advertising packets indicating that a connection request is not acceptable takes a relatively longer time to transmit them.

In an example, the criterion may be the distance between the mobile terminal 103 and the MFP 101 estimated by the mobile terminal 103. Depending on the signal strength of the received advertising packet, the mobile terminal 103 can estimate a rough distance to the MFP 101 that has transmitted the advertising packet. In a case in which the distance to the MFP 101 is estimated to be large, even when the MFP 101 transmits an advertising packet indicating that a connection request for GATT communication is acceptable, there is a high possibility that packet loss occurs so the mobile terminal 103 cannot detect the advertising packet. Even in such a case, by setting a longer time to suspend the transmission of a connection request, the mobile terminal can wait until an advertising packet indicating that a connection request for GATT communication is acceptable is transmitted again. This can reduce the probability of the failure of a connection request due to packet loss.

Note that these criteria may be set by the user of the mobile terminal 103, or may be adaptively determined by the mobile terminal 103. For example, every time an advertising packet is received in step S503 shown in FIG. 5B, the mobile terminal 103 records the PDU type, transmission interval, signal strength, or switching interval of each of the advertising packets transmitted from the same MFP 101. According to this, the mobile terminal 103 can determine the suspension time to be set for the MFP targeted for the operation.

As described above, in the second embodiment, the mobile terminal can set the time to suspend the transmission of a connection request based on one or more criteria. With this arrangement, for each use case such as the operation mode of the MFP and the positional relationship between the mobile terminal and the MFP, GATT communication can be established without degrading the responsiveness to the user.

In addition, the time interval to suspend the transmission of a connection request can be set for each MFP targeted for the operation in the second embodiment. With this arrangement, the responsiveness to the user of the mobile terminal that transmits a connection request can be improved regardless of the setting of the MFP.

In the second embodiment, the mobile terminal can estimate the distance between the mobile terminal and MFP, and set the time to suspend the transmission of a connection request depending on the estimated distance. With this arrangement, even when the advertising packet transmitted from the MFP cannot be detected due to packet loss, an opportunity to transmit the advertising packet again from the same MFP is provided. This can reduce the probability of the failure of a connection request due to packet loss.

Third Embodiment

In the first embodiment, when an advertising packet indicating that a connection request is not acceptable is received and the predetermined time has not elapsed, the mobile terminal performs detection of another advertising packet immediately thereafter.

Figure 7:
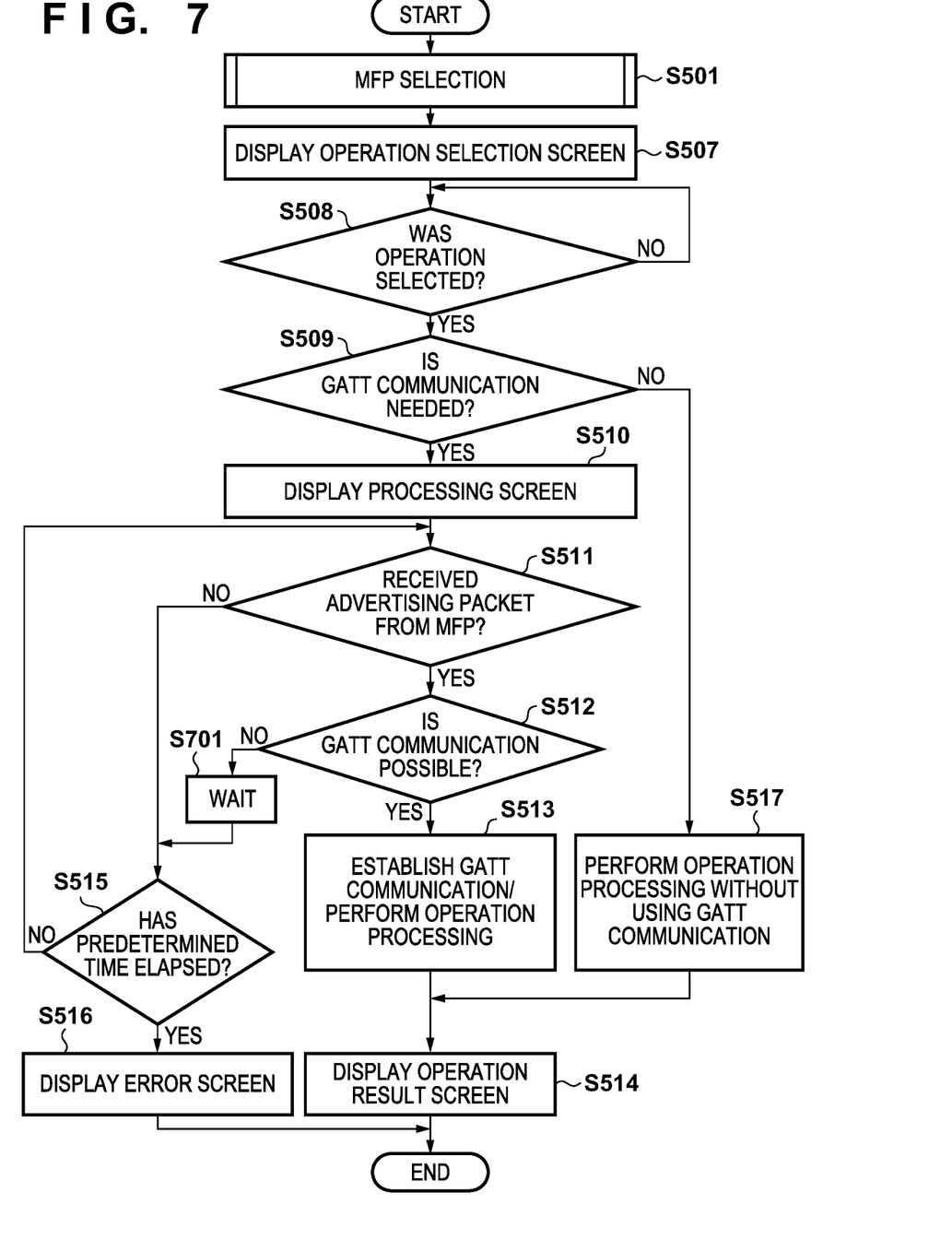
FIG. 7 is a flowchart illustrating an example of the processing performed by a communication terminal according to the third embodiment.

In an example, if an advertising packet indicating that a connection request is not acceptable is received from the MFP targeted for the operation, a scan process may be waited based on an assumption that it takes some time before an advertising packet indicating that a connection request is acceptable is transmitted. In this case, as shown in FIG. 7, if it is determined that the advertising packet received in step S511 indicates that a connection request is not acceptable (NO in step S512), the mobile terminal 103 advances the process to step S701, and can wait for a scan process for a predetermined time (waiting time). The waiting time may be a time associated with the advertising packet switching interval for example. Then, the mobile terminal 103 advances the process to step S515, and determines whether the predetermined time has elapsed. If the predetermined time has not elapsed, the mobile terminal 103 performs detection of an advertising packet again.

As described above, if an advertising packet indicating that a connection request is not acceptable is transmitted, the mobile terminal waits for a process for a predetermined time. With this arrangement, a connection request can be transmitted after receiving an advertising packet indicating that a connection request is acceptable, while suppressing the power consumption required for an advertising packet reception process.

Other Embodiments

The above-described first to third embodiments can be optionally combined. For example, the mobile terminal can associate the waiting time of a scan process of an advertising packet according to the third embodiment with the suspension time of the transmission of a connection request according to the second embodiment.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-021251, filed Feb. 8, 2018 which is hereby incorporated by reference herein in its entirety.

What is claimed is:

1. A communication terminal that performs wireless communication based on BLE (Bluetooth Low Energy) with an image processing apparatus that switches a plurality of periods, including a first operational period, in which a connection request for GATT (Generic Attribute) communication is acceptable, for broadcasting an advertising packet whose type is a first type and a second operational period, in which a connection request for GATT communication is not acceptable, for broadcasting an advertising packet whose type is a second type, the communication terminal comprising:
one or more controllers configured to function as:
a determination unit for receiving a first advertising packet whose type is the first type and determining a connection request for GATT communication based on the received first advertising packet; and
a transmission control unit for holding the determined connection request during the second operational period, and then transmitting the determined connection request to the image processing apparatus according to receiving a second advertising packet whose type is the first type,
wherein the first type advertising packet is an advertising packet used by first software that displays a list of a plurality of image processing apparatuses, and the second type advertising packet is an advertising packet used by second software, and
wherein the GATT communication is used for a predetermined process, and the predetermined process is one of a Wi-Fi connection establishment process, a data transmission process, or a login process.

2. The communication terminal according to claim 1, wherein
the controller identifies the type of received advertising packet by analyzing a PDU type described in the received advertising packet.

3. The communication terminal according to claim 2, wherein the controller identifies the type of received advertising packet to be the first type when the PDU type is determined to be ADV_IND by the analysis.

4. The communication terminal according to claim 1, wherein the connection request is determined to be transmitted in accordance with an operation using the communication terminal by a user of the communication terminal.

5. The communication terminal according to claim 1, wherein the second advertising packet is received, after the first advertising packet is received and then an advertising packet whose type is identified to be the second type is received.

6. The communication terminal according to claim 1, wherein the communication terminal is a handheld device.

7. A method performed by a communication terminal for wireless communication based on BLE (Bluetooth Low Energy) with an image processing apparatus which switches a plurality of periods, including a first operational period, in which a connection request for GATT (Generic Attribute) communication is acceptable, for broadcasting an advertising packet whose type is a first type and a second operational period, in which a connection request for GATT communication is not acceptable, for broadcasting an advertising packet whose type is a second type, the method comprising:

receiving a first advertising packet whose type is the first type and determining a connection request for GATT communication based on the received first advertising packet; and holding the determined connection request during the second operational period, and then transmitting, according to receiving a second advertising packet whose type is the first type the determined connection request to the image processing apparatus, wherein the first type advertising packet is an advertising packet used by first software that displays a list of a plurality of image processing apparatuses, and the second type advertising packet is an advertising packet used by second software, and wherein the GATT communication is used for a predetermined process, and the predetermined process is one of a Wi-Fi connection establishment process, a data transmission process, or a login process.

8. A non-transitory computer-readable storage medium storing a program for a method performed by a communication terminal for wireless communication based on BLE (Bluetooth Low Energy) with an image processing apparatus which switches a plurality of periods, including a first operational period, in which a connection request for GATT (Generic Attribute) communication is acceptable, for broadcasting an advertising packet whose type is a first type and a second operational period, in which a connection request for GATT communication is not acceptable, for broadcasting an advertising packet whose type is a second type, the method comprising:

receiving a first advertising packet whose type is the first type and determining a connection request for GATT communication based on the received first advertising packet; and holding the determined connection request during the second operational period, and then transmitting, according to receiving a second advertising packet whose type is the first type, the determined connection request to the image processing apparatus, wherein the first type advertising packet is an advertising packet used by first software that displays a list of a plurality of image processing apparatuses, and the second type advertising packet is an advertising packet used by second software, and wherein the GATT communication is used for a predetermined process, and the predetermined process is one of a Wi-Fi connection establishment process, a data transmission process, or a login process.

9. The communication terminal according to claim 1, wherein the second type advertising packet is an advertising packet of an iBeacon format or an Eddystone format.

10. The communication terminal according to claim 1, wherein the communication terminal includes software for cooperating with a scanner of the image processing apparatus.

11. The communication terminal according to claim 1, wherein the communication terminal can perform direct wireless LAN (local area network) communication or indirect wireless LAN communication.

12. The non-transitory computer-readable storage medium according to claim 8, wherein the method further comprises identifying the type of received advertising packet by analyzing a PDU type described in the received advertising packet.

13. The non-transitory computer-readable storage medium according to claim 12, wherein the method further comprises identifying the type of received advertising packet to be the first type when the PDU type is determined to be ADV_IND by the analysis.

14. The non-transitory computer-readable storage medium according to claim 8, wherein the connection request is determined to be transmitted in accordance with an operation using the communication terminal by a user of the communication terminal.

15. The non-transitory computer-readable storage medium according to claim 8, wherein the second advertising packet is received after the first advertising packet is received and then an advertising packet whose type is identified to be the second type is received.

16. The non-transitory computer-readable storage medium according to claim 8, wherein the communication terminal is a handheld device.

17. The non-transitory computer-readable storage medium according to claim 8, wherein the second type advertising packet is an advertising packet of an iBeacon format or an Eddystone format.

18. The non-transitory computer-readable storage medium according to claim 8, wherein the program further includes software for cooperating with a scanner of the image processing apparatus.

19. The non-transitory computer-readable storage medium according to claim 8, wherein the communication terminal can perform direct wireless LAN (local area network) communication or indirect wireless LAN communication.

* * * * *